US012753083B2

(12) United States Patent
Van Vuuren et al.

(10) Patent No.: US 12,753,083 B2
(45) Date of Patent: Oct. 6, 2026

(54) PRODUCTION OF ALKALI METAL CARBONATES AND/OR BICARBONATES FROM ALKALI METAL SULPHATES

(71) Applicants: University of Pretoria, Pretoria (ZA); University of Limpopo, Sovenga (ZA)

(72) Inventors: David Steyn Van Vuuren, Pretoria (ZA); Johannes Philippus Maree, Pretoria (ZA)

(73) Assignees: University of Pretoria, Pretoria (ZA); University of Limpopo, Sovenga (ZA)

( * ) Notice: Subject to any disclaimer, the term of this patent is extended or adjusted under 35 U.S.C. 154(b) by 527 days.

(21) Appl. No.: 18/037,669

(22) PCT Filed: Nov. 18, 2021

(86) PCT No.: PCT/IB2021/060690

§ 371 (c)(1),
(2) Date: May 18, 2023

(87) PCT Pub. No.: WO2022/107033

PCT Pub. Date: May 27, 2022

(65) Prior Publication Data

US 2024/0051836 A1 Feb. 15, 2024

(30) Foreign Application Priority Data

Nov. 18, 2020 (ZA) ................................ 2020/07178

(51) Int. Cl.
*C01D 7/00* (2006.01)

(52) U.S. Cl.
CPC .................................... *C01D 7/00* (2013.01)

(58) Field of Classification Search
CPC ........................................................ C01D 7/00
See application file for complete search history.

(56) References Cited

U.S. PATENT DOCUMENTS 3,107,142 A * 10/1963 Schoeffel ........... D21C 11/0085 423/183
3,134,639 A * 5/1964 Nylander ................. C01D 7/02 423/428

(Continued)

FOREIGN PATENT DOCUMENTS

CN 107649492 A * 2/2018 ............... B09B 3/00

OTHER PUBLICATIONS

English Translation of CN 107649492 A (Year: 2018).*

(Continued)

*Primary Examiner* — Paul A Wartalowicz
*Assistant Examiner* — Slone Elizabeth Simkins
(74) *Attorney, Agent, or Firm* — Foley Hoag LLP; Dana M. Gordon; Laura A. Wzorek

(57) ABSTRACT

The invention provides a method of producing a carbonate or a bicarbonate of an alkali metal, in solid form, from a sulphate of the alkali metal. The method includes, in a first reaction step, reacting, in aqueous medium, a sulphate of an alkali metal with one or more alkaline earth metal sulphides, thus forming an aqueous solution of one or more sulphides of the alkali metal and one or more sulphates of the alkaline earth metal in solid form. The method also includes, in a second reaction step, in the aqueous solution of one or more sulphides of the alkali metal, reacting the one or more sulphides of the alkali metal with carbon dioxide ($CO_2$) in gaseous form, thus forming an aqueous solution of a bicarbonate of the alkali metal and gaseous hydrogen sulphide. The method further includes, in a recovery step, recovering a carbonate or the bicarbonate of the alkali metal, in solid form, from the aqueous solution of the bicarbonate of the alkali metal.

11 Claims, 2 Drawing Sheets

(56) References Cited

U.S. PATENT DOCUMENTS

Figure 1:
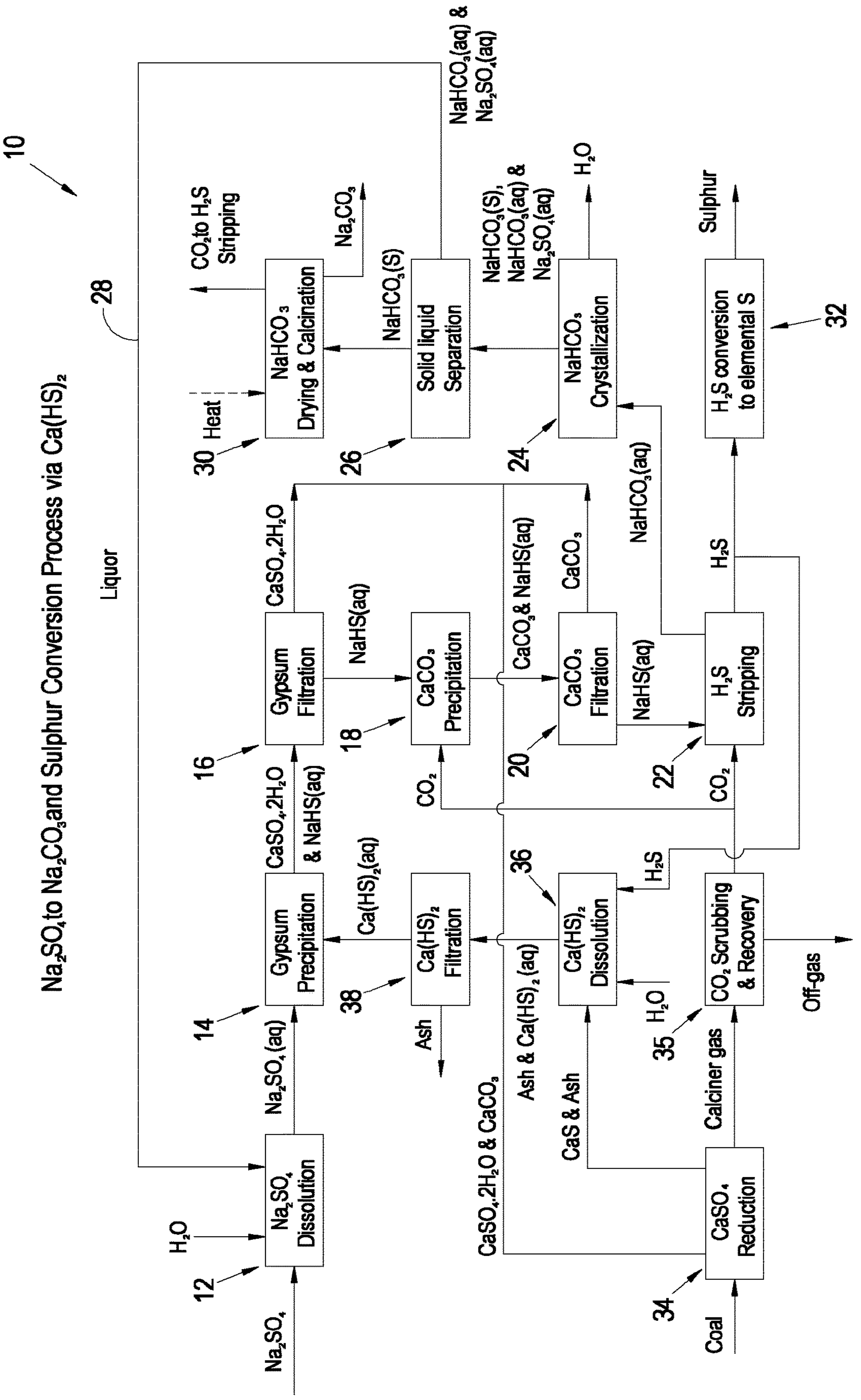

| | | | | | |
|---|---|---|---|---|---|
| 3,591,332 | A | * | 7/1971 | Riley | C01B 17/32<br>423/563 |
| 3,935,100 | A | * | 1/1976 | Alagy | C02F 1/5236<br>423/563 |
| 4,198,385 | A | | 4/1980 | Feldbaumer et al. | |
| 4,248,605 | A | * | 2/1981 | Lancet | C10G 1/006<br>208/15 |
| 4,309,398 | A | | 1/1982 | Sheth | |
| 4,618,480 | A | * | 10/1986 | Hazen | C01D 5/008<br>423/183 |
| 5,035,807 | A | | 7/1991 | Maree | |

OTHER PUBLICATIONS

Hlabela et al., "Thermal reduction of barium sulphate with carbon monoxide—A thermogravimetric study", Thermochimica acta 498. 1-2: 67-70 (2010).

International Search Report and Written Opinion for International Application No. PCT/IB2021/060690 dated Oct. 3, 2022.

* cited by examiner

PRODUCTION OF ALKALI METAL CARBONATES AND/OR BICARBONATES FROM ALKALI METAL SULPHATES

RELATED APPLICATIONS

This application is a U.S. National Stage Application of International Application No. PCT/IB2021/060690, filed Nov. 18, 2021; which claims the benefit of priority to South African Patent Application No. 2020/07178, filed Nov. 18, 2020.

FIELD OF THE INVENTION

THIS INVENTION relates to the production of an alkali metal carbonate and/or bicarbonate from a sulphate of an alkali metal. The invention provides a method of producing a bicarbonate and, optionally, a carbonate of an alkali metal from a sulphate of the alkali metal. The invention extends to a process for producing a bicarbonate and, optionally, a carbonate of an alkali metal from a sulphate of an alkali metal. The invention also extends to an alkali metal carbonate and/or bicarbonate produced by the method of the invention.

SUMMARY OF THE INVENTION

IN ACCORDANCE WITH ONE ASPECT OF THE INVENTION IS PROVIDED a method of producing a bicarbonate and, optionally, a carbonate of an alkali metal from a sulphate of the alkali metal, the method including:

- in a first reaction step, reacting, in aqueous medium, a sulphate of an alkali metal with one or more alkaline earth metal sulphides, thus forming an aqueous solution of one or more sulphides of the alkali metal; and
- in a second reaction step, in the aqueous solution of one or more sulphides of the alkali metal, reacting the one or more sulphides of the alkali metal with carbon dioxide ($CO_2$) in gaseous form, thus forming an aqueous solution of a bicarbonate of the alkali metal.

The method may be a method of producing a solid bicarbonate and/or carbonate of the alkali metal, and the method may therefore include, in a recovery step (alkali metal bicarbonate and/or carbonate recovery step), recovering the bicarbonate of the alkali metal or a carbonate of the alkali metal, in solid form, from the aqueous solution of the bicarbonate of the alkali metal. The method may therefore include producing either a carbonate or a bicarbonate of the alkali metal, in solid form.

The alkali metal may, for example, be selected from sodium and potassium. Thus, the sulphate of the alkali metal may be selected from sodium sulphate ($Na_2SO_4$) and potassium sulphate ($K_2SO_4$).

When the sulphate of the alkali metal is $Na_2SO_4$, the carbonate of the alkali metal would be sodium carbonate ($Na_2CO_3$) and the bicarbonate of the alkali metal would be sodium bicarbonate ($NaHCO_3$).

When the sulphate of the alkali metal is $K_2SO_4$, the carbonate of the alkali metal would be potassium carbonate ($K_2CO_3$) and the bicarbonate of the alkali metal would be potassium bicarbonate ($KHCO_3$).

The one or more alkaline earth metal sulphides may be selected from one or a combination of a sulphide and a hydrosulphide of the alkaline earth metal. It follows that the one or more sulphides of the alkali metal may be one or a combination of an alkali metal sulphide and an alkali metal hydrosulphide.

Thus, when the alkali metal is sodium, the one or more sulphides of the alkali metal formed in the first reaction step may be one or a combination of sodium sulphide ($Na_2S$) and sodium hydrosulphide (NaHS). Similarly, when the alkali metal is potassium, the one or more sulphides of the alkali metal formed in the first reaction step may be one or a combination of potassium sulphide ($K_2S$) and potassium hydrosulphide (KHS).

It is noted that the alkaline earth metal sulphide (i.e. the sulphide and/or hydrosulphide of the alkaline earth metal) may be present, and may thus be used, in solution, e.g. aqueous solution. Thus, the method may include a prior step of producing an aqueous solution of the alkaline earth metal sulphide or hydrosulphide, optionally filtering insoluble solids from the solution, and using the solution for reaction between the alkaline earth metal sulphide or hydrosulphide and the alkali metal sulphate.

An aqueous solution of an alkaline earth metal hydrosulphide may be produced by reacting a sulphide of the alkaline earth metal in water with hydrogen sulphide ($H_2S$), typically in gaseous form, which may be hydrogen sulphide produced in the second reaction step as hereinafter described.

The alkaline earth metal may, for example, be selected from calcium and barium. Thus, the one or more alkaline earth metal sulphides may be selected from one or a combination of calcium sulphide (CaS) and calcium hydrosulphide ($Ca(HS)_2$) or one or a combination of barium sulphide (BaS) and barium hydrosulphide ($Ba(HS)_2$).

Barium sulphide is soluble in water and the method may therefore include using barium sulphide, as the alkaline earth metal sulophide, as an aqueous solution of barium sulphide, alternatively as an aqueous solution of barium hydrosulphide prepared as described above.

When barium sulphide or barium hydrosulphide is used, the barium sulphide or barium hydrosulphide may be used in stoichiometric excess to that required for virtually complete stoichiometric conversion of the sulphate of the alkali metal to the sulphide of the alkali metal.

In the case of calcium being the alkaline earth metal, using calcium hydrosulphide may be preferred and the method may therefore include reacting calcium sulphide, in water, with hydrogen sulphide, typically in gaseous form, thus producing an aqueous solution of calcium hydrosulphide. As noted above, the hydrogen sulphide may be hydrogen sulphide produced in the second reaction step as hereinafter described.

In reacting the sulphate of the alkali metal with the one or more alkaline earth metal sulphides, one or more insoluble or slightly soluble compounds of the alkaline earth metal may form, e.g. as a precipitate. Such compounds may include sulphates and/or hydroxides of the alkaline earth metal.

For example, when the sulphate of the alkali metal is reacted with CaS and/or $Ca(HS)_2$, gypsum (i.e. hydrous calcium sulphate, or $CaSO_4 \cdot 2H_2O$) in solid form (i.e. as a precipitate) may form. In such a case, the reaction of the sulphate of the alkali metal with CaS and/or $Ca(HS)_2$ may in effect be a gypsum precipitation step. Some calcium hydroxide ($Ca(OH)_2$) may also form.

Similarly, when the sulphate of the alkali metal is reacted with BaS and/or $Ba(HS)_2$, barium sulphate ($BaSO_4$) may form. In such a case, the reaction of the sulphate of the alkali metal with BaS and/or $Ba(HS)_2$ may in effect be a $BaSO_4$ precipitation step.

The method may include, in a first separation step ahead of the second reaction step, separating, typically by filtration, centrifugation or sedimentation, undissolved compounds of the alkaline earth metal, such as gypsum, $Ca(OH)_2$ or $BaSO_4$, from the aqueous solution of the one or more sulphides of the alkali metal.

The method may also include, in a residual alkaline earth metal recovery step, recovering residual alkaline earth metal (e.g. $Ca^{2+}$ and/or $Ba^{2+}$) that is dissolved in the aqueous solution of the one or more sulphides of the alkali metal.

More specifically, the residual alkaline earth metal recovery step may include precipitating residual alkaline earth metal from the solution as a carbonate of the alkaline earth metal, e.g. as $CaCO_3$ or as $BaCO_3$. This may be achieved by adding a carbonate to the solution, e.g. in the form of gaseous carbon dioxide, or one or both of alkali metal carbonate and alkali metal bicarbonate. Such alkali metal carbonate and/or bicarbonate may have been produced by performing the method of the invention.

The method may therefore include, in the residual alkaline earth metal recovery step, recovering residual alkaline earth metal that is dissolved in the aqueous solution of the one or more sulphides of the alkali metal by reacting such residual alkaline earth metal with one or more of $CO_2$ in gaseous form, alkali metal carbonate, and alkali metal bicarbonate, thus producing a precipitate comprising a carbonate of the alkaline earth metal in solid form.

The method may also include, in a second separation step, separating, typically by filtration, alkaline earth metal carbonate from the aqueous solution of the one or more sulphides of the alkali metal or from the aqueous solution of the bicarbonate of the alkali metal, depending on when the residual alkaline earth metal recovery step is performed as discussed below.

When the alkaline earth metal is barium, barium carbonate formed from residual barium in the residual alkaline earth metal recovery step and separated from the solution of the one or more sulphides of the alkali metal in the second separation step, may be reacted with alkali metal sulphate before reacting alkali metal sulphate with barium sulphide, as the alkaline earth metal sulphide, in the first reaction step, thereby to form insoluble barium sulphate in solid form. Such barium sulphate may then in the first separation step be separated from the aqueous solution of one or more alkali metal sulphides that is formed in the first reaction step. Thus, residual alkaline earth metal that was present in the aqueous solution of the one or more sulphides of the alkali metal may be recovered from solution.

In reacting, in the second reaction step, the one or more sulphides of the alkali metal with carbon dioxide ($CO_2$), to form the aqueous solution of the bicarbonate of the alkali metal, hydrogen sulphide ($H_2S$) in gaseous form may be formed.

Thus, the second reaction step of reacting one or more sulphides of the alkali metal with carbon dioxide to form the bicarbonate of the alkali metal in solution may, in effect, be a hydrogen sulphide stripping step, whereby $S^{2-}$ and $HS^-$ anions in the solution are converted to $H_2S$, thus being stripped from the aqueous solution of the one or more sulphides of the alkali metal in producing the aqueous solution of the bicarbonate of the alkali metal.

The residual alkaline earth metal recovery step and the $H_2S$ stripping step may be performed either as sequential steps or as a single step. In the latter case, the second separation step may follow the combined residual alkaline earth metal recovery and $H_2S$ stripping step.

In other words, the residual alkaline earth metal recovery step may be performed ahead of the second reaction step. The method may then include, in a second separation step, separating the precipitate comprising the carbonate of the alkaline earth metal in solid form from the solution of the one or more sulphides of the alkali metal.

Alternatively, the residual alkaline earth metal recovery step may be combined with the second reaction step. The method may then include, in a second separation step, separating the precipitate comprising the carbonate of the alkaline earth metal in solid form from the aqueous solution of the bicarbonate of the alkali metal.

The $H_2S$ formed in the second reaction step may be used to produce an alkaline earth metal hydrosulphide for use in the first reaction step, as described above, for example using either fresh alkaline earth metal sulphide or regenerated alkaline earth metal sulphide.

Alternatively, or in addition, the method may include, in a hydrogen sulphide processing step, converting the hydrogen sulphide to elemental sulphur or to sulphuric acid.

The method may further include, in a regeneration step, regenerating one or more of the alkaline earth metal sulphides.

Such regeneration may be achieved, for example, by subjecting recovered undissolved alkaline earth metal compounds, such as sulphates of the alkaline earth metal, e.g. gypsum or barium sulphate, separated from the aqueous solution of one or more sulphides of the alkali metal in the first separation step, to carbothermal reduction to produce a sulphide of the alkaline earth metal.

In other words, the method may include, in an alkaline earth metal sulphide regeneration step, regenerating one or more alkaline earth metal sulphides by subjecting one or more sulphates of the alkaline earth metal, formed in the first reaction step, to carbothermal reduction, thus producing regenerated alkaline earth metal sulphides. Regenerated alkaline earth metal sulphides thus produced, may then be used in performing the first reaction step.

The carbothermal reduction may be effected with a carbon reductant, such as coal, at an elevated temperature of around 800 to 1200° C. Thus, for example, calcium sulphide or barium sulphide may respectively be produced, and thus regenerated for re-use in performing the first reaction step of the method of the invention.

If calcium sulphide is regenerated and calcium hydrosulphide is required for use in performing the first reaction step, to produce calcium hydrosulphide, in aqueous solution, from regenerated calcium sulphide, regenerated calcium sulphide may be reacted, in water, with hydrogen sulphide in gaseous form, e.g. hydrogen sulphide formed in the second reaction step.

In other words, when the alkaline earth metal is calcium and the alkaline earth metal sulphide that is regenerated in the regeneration step is calcium sulphide and calcium hydrosulphide is desired, and the method may include reacting the regenerated calcium sulphide, in water, with gaseous hydrogen sulphide produced in the second reaction step, thus producing an aqueous solution of regenerated calcium hydrosulphide If barium sulphide is regenerated, such regenerated barium sulphide may be dissolved in water to produce a solution of regenerated barium sulphide for use in performing the first reaction step. If barium hydrosulphide is required, regenerated barium sulphide may be reacted, in water, with hydrogen sulphide in gaseous form, e.g. hydrogen sulphide formed in the second reaction step.

In other words, when the alkaline earth metal is barium and alkaline earth metal sulphide that is regenerated in the regeneration step is barium sulphide, the method may include dissolving the regenerated barium sulphide in water, thus producing an aqueous solution of regenerated barium sulphide, or the method may include reacting regenerated barium sulphide, in water, with hydrogen sulphide, to produce an aqueous solution of barium hydrosulphide.

In the case of calcium being the alkaline earth metal, regeneration of alkaline earth metal sulphides for use in the first reaction step may include using calcium carbonate that formed from residual calcium in the residual alkaline earth metal recovery step and was recovered in the second separation step.

More specifically method may include recovering (separating) such calcium carbonate and then subjecting it to thermal treatment, e.g. together with carbothermal reduction of the gypsum, thus producing calcium oxide (CaO). The CaO may be reacted, typically in water, with hydrogen sulphide, e.g. that which is formed in the second reaction step, to produce regenerated $Ca(HS)_2$.

The method may include using regenerated alkaline earth metal sulphides or regenerated calcium hydrosulphide or regenerated barium sulphide or regenerated barium hydrosulphide as the alkaline earth metal sulphide in performing the first reaction step.

As stated above, in reacting the one or more sulphides of the alkali metal in the aqueous solution of one or more sulphides of the alkali metal with carbon dioxide ($CO_2$) in gaseous form, the bicarbonate of the alkali metal is produced, in aqueous solution.

Recovering a carbonate and/or the bicarbonate of the alkali metal in solid form from the aqueous solution of the bicarbonate of the alkali metal, in the recovery step, may include crystallizing solid alkali metal carbonate and/or bicarbonate from solution, e.g. by evaporative, cooling or eutectic freeze crystallisation.

In the case of the alkali metal being sodium, in which case the aqueous solution of the bicarbonate of the alkali metal comprises sodium bicarbonate, evaporative crystallisation would typically produce sodium carbonate in solid form.

In the case of the alkali metal being potassium, in which case the aqueous solution of the bicarbonate of the alkali metal comprises potassium bicarbonate, evaporative crystallisation would typically produce potassium bicarbonate in solid form.

Thus, in the case of the aqueous solution of the bicarbonate of the alkali metal comprising predominantly $NaHCO_3$, the following chemical reaction (equation 1) takes place when evaporative crystallization is used in the recovery step, with sodium carbonate being recovered from the aqueous solution in solid form:

$$2NaHCO_3(aq)=Na_2CO_3(s)+H_2O(g)+CO_2(g) \qquad \text{Eq. 1}$$

In the case of the aqueous solution of the bicarbonate of the alkali metal comprising predominantly $KHCO_3$ the following chemical reaction (equation 2) takes place when evaporative crystallization is used in the recovery step, with potassium bicarbonate being recovered from the aqueous solution in solid form:

$$KHCO_3(aq)=KHCO_3(s) \qquad \text{Eq. 2}$$

To recover the bicarbonate of the alkali metal in solid form from the solution of the bicarbonate of the alkali metal when the carbonate tends to form through evaporative crystallisation as described above, cooling or eutectic freeze crystallisation may be performed as an alternative.

Alternatively, when the carbonate of the alkali metal tends to form through evaporative crystallisation, as described above, and it is desired to recover the bicarbonate of the alkali metal in solid form from the solution, the method may include subjecting the solution of the alkali metal bicarbonate to carbonation, e.g. by contacting a solution of the carbonate of the alkali metal with gaseous $CO_2$ when recovering the bicarbonate in solid form.

When the bicarbonate of the alkali metal tends to be recovered in solid form from the aqueous solution of the bicarbonate of the alkali metal through evaporative crystallisation and a carbonate of the alkali metal is desired instead, the method may include subjecting the bicarbonate of the alkali metal in solid form to heat treatment, thus producing alkali metal carbonate.

Heat treatment of the alkali metal bicarbonate to produce alkali metal carbonate, when alkali metal bicarbonate is crystallised from solution, may be calcining heat treatment.

Conversion of the alkali metal bicarbonate to alkali metal carbonate would release carbon dioxide, which may be used in the residual alkaline earth metal recovery step and/or in the step of reacting the one or more sulphides of the alkali metal, with carbon dioxide.

THE INVENTION EXTENDS TO a process for producing a a bicarbonate and, optionally, a carbonate of an alkali metal from a sulphate of the alkali metal in accordance with the method of the invention, the process comprising

- a first reaction stage for performing the first reaction step of the method of the invention; and
- a second reaction stage for performing the second reaction step of the invention.

The process may also include a recovery stage for performing the recovery step of the invention.

The process may also include a first separation stage for performing the first separation step of the method of the invention.

The process may further include a regeneration stage for regenerating alkaline earth metal sulphides according to the regeneration step of the method of the invention, and may include recycling such regenerated alkaline earth metal sulphides to the first reaction stage and using such regenerated alkaline earth metal sulphides in performing the first reaction step in the first reaction stage.

The process may also include a residual alkaline earth metal recovery stage, which may be combined with the second reaction stage, for performing the residual alkaline earth metal recovery step of the method of the invention. The process may also include, in accordance with the method of the invention, using alkaline earth metal carbonates produced in the residual alkaline earth metal recovery stage to regenerate alkaline earth metal sulphides in accordance with the method of the invention.

In one embodiment of the invention, the process may include:

- in the first reaction stage,
  - dissolving a sulphate of an alkali metal in water, thus producing an aqueous solution of the sulphate of the alkali metal;
  - adding one or more alkaline earth metal sulphides, optionally in aqueous solution, to the aqueous solution of the sulphate of the alkali metal, thus reacting the dissolved sulphate of the alkali metal with the one or more alkaline earth metal sulphides and producing an aqueous solution of one or more sulphides of the alkali metal and a precipitate comprising a sulphate of the alkaline earth metal;
- in the first separation stage, separating the precipitate comprising a sulphate of the alkaline earth metal from the aqueous solution of one or more sulphides of the alkali metal;
- in the second reaction stage, adding carbon dioxide ($CO_2$) in gaseous form to the aqueous solution of one or more sulphides of the alkali metal, thus reacting, in aqueous solution, the one or more sulphides of the alkali metal with the $CO_2$ and producing an aqueous solution of a bicarbonate of the alkali metal and gaseous hydrogen sulphide; and in the recovery stage, recovering a carbonate of the alkali metal and/or the bicarbonate of the alkali metal in solid form from the aqueous solution of the bicarbonate of the alkali metal by means of crystallisation.

THE INVENTION ALSO EXTENDS TO an alkali metal carbonate and/or an alkali metal bicarbonate produced according to the method or process of the invention.

EXAMPLES

Figure 2:
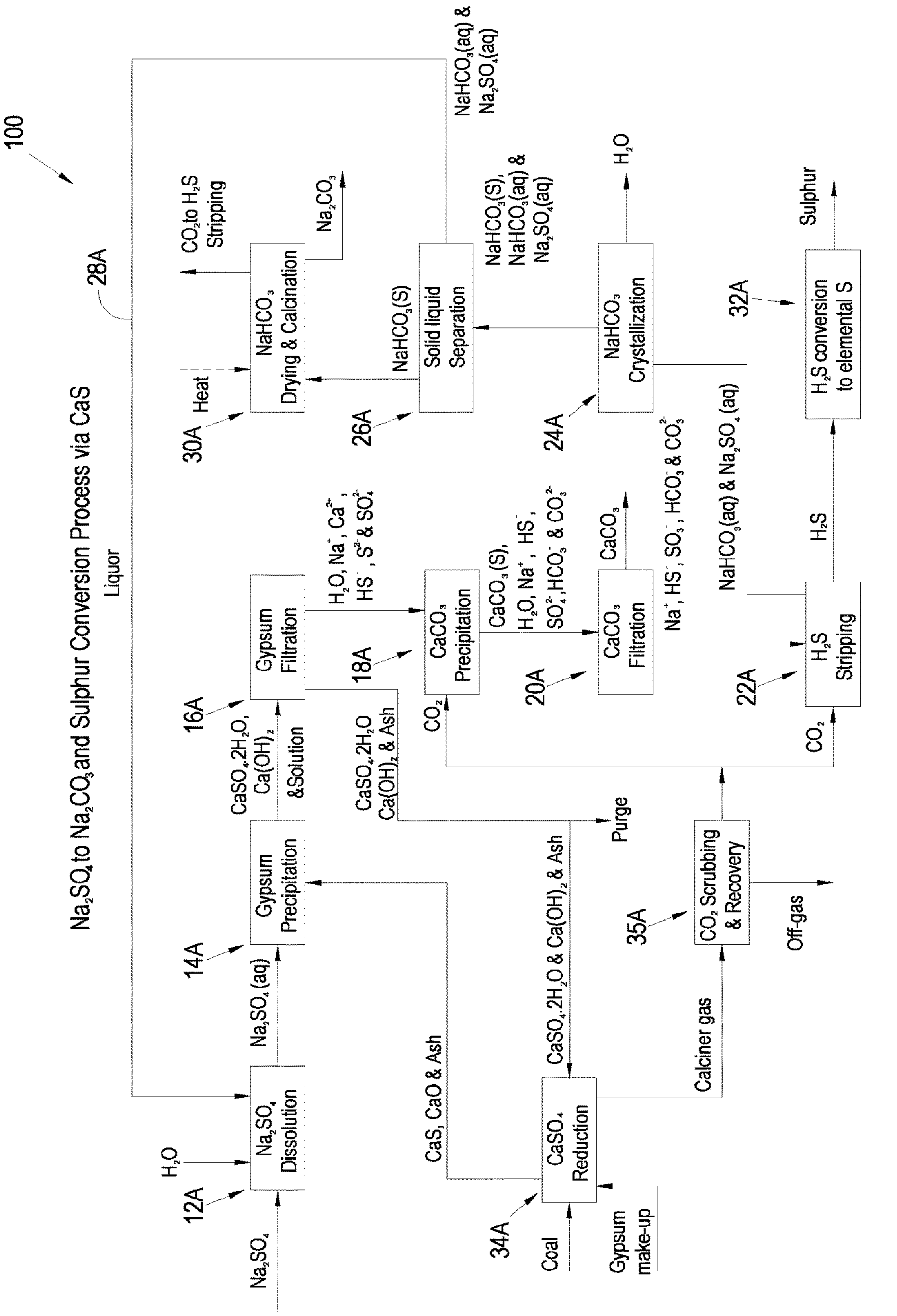

THE INVENTION WILL NOW BE DESCRIBED IN MORE DETAIL and by way of example only, with reference to the accompanying drawings, in which FIG. 1 shows one embodiment of a process for performing the method of the invention; and FIG. 2 shows another embodiment of a process for performing the method of the invention.

Referring to FIG. 1 of the drawings, reference numeral 10 generally indicates one embodiment of a process for performing the method of the invention, to produce sodium carbonate ($Na_2CO_3$) from sodium sulphate ($Na_2SO_4$) by reaction of the sodium sulphate with calcium hydrosulphide ($Ca(HS)_2$).

In the process 10, the alkaline earth metal sulphide used according to the method of the invention, is therefore $Ca(HS)_2$.

The process 10 includes a $Na_2SO_4$ dissolution stage 12.

In the dissolution stage 12, solid $Na_2SO_4$ is dissolved in water. Thus, an aqueous solution of $Na_2SO_4$ is produced.

The process 10 further includes a gypsum precipitation stage 14 (first reaction stage) in which the first reaction step of the method of the invention is performed.

In the gypsum precipitation stage 14, the aqueous solution of $Na_2SO_4$ from the dissolution stage 12 is mixed with approximately a stoichiometric amount of $Ca(HS)_2$ in aqueous solution. In accordance with the invention, there may have been a prior step of forming $Ca(HS)_2$ in aqueous solution by dissolving CaS in water and reacting with $H_2S$, thus mixing an aqueous solution of an approximately stoichiometric amount of $Ca(HS)_2$ with the aqueous solution of $Na_2SO_4$ in the gypsum precipitation stage.

Mixing of the two solutions results in $Na_2SO_4$ reacting with $Ca(HS)_2$, thus forming an aqueous solution of sodium hydrosulphide (NaHS) (hereinafter referenced as "the aqueous solution of NaHS") and precipitated gypsum ($CaSO_4·2H_2O$). This is in accordance with reaction equation 3:

$$Na_2SO_4(aq)+Ca(HS)_2(aq)+2H_2O=2NaHS(aq)+CaSO_4·2H_2O(s) \quad \text{Eq. 3}$$

The process 10 also includes a first separation stage 16.

In the first separation stage 16, gypsum is separated from the aqueous solution of NaHS. Such separation may be effected by way of known solid liquid separation techniques, including filtration, centrifuging or sedimentation. In the case of the present example, filtration is used.

Whereas gypsum has a finite solubility, the aqueous solution of NaHS obtained after separation of gypsum, also contains some dissolved calcium cations. Such cations are usually undesired in final products.

The process 10 therefore includes a residual calcium recovery stage 18.

In the recovery stage 18, calcium is removed from the aqueous solution of NaHS (the filtrate from the first separation stage 16), by the addition of a sufficient amount of carbonate to precipitate calcium carbonate ($CaCO_3$) from the solution. Calcium carbonate has a much lower solubility in water than gypsum, i.e. about 100 times lower.

In the present example, calcium carbonate precipitation is effected by adding $CO_2$ to the solution of NaHS, in the residual calcium recovery stage 18. As an alternative, it is also possible to add sodium carbonate ($Na_2CO_3$) or sodium bicarbonate ($NaHCO_3$) instead of $CO_2$.

The process 10 further includes a second separation stage 20.

In the second separation stage 20, precipitated $CaCO_3$ is separated from the aqueous solution of NaHS from the residual calcium recovery stage 16, thus producing a NaHS solution filtrate.

The NaHS solution filtrate obtained from the second separation stage 20 contains mostly $HS^-$ anions, but it may also contain some carbonate, bicarbonate, sulphide and sulphate anions.

The process further includes a $H_2S$ stripping stage 22 (second reaction stage), in which the second reaction step of the method of the invention is performed.

In the stripping stage 22, $H_2S$ is stripped from the NaHS filtrate with $CO_2$.

It is noted that since $CO_2$ is a stronger acid than $H_2S$, all the $S^{2-}$ and $HS^-$ anions in the solution are converted to molecular $H_2S$, which is stripped from the solution. This is in accordance with reaction equation 4:

$$NaHS(aq)+CO_2+H_2O{=\!=}NaHCO_3(aq)+H_2S(g) \quad \text{Eq. 4}$$

After stripping of $H_2S$ from the solution, a solution comprising mostly dissolved sodium bicarbonate ($NaHCO_3$) is obtained (hereinafter referenced as "the $NaHCO_3$ solution"), but there may also be some sulphate and carbonate ions present in the solution.

In accordance with the invention, the residual calcium recovery stage 18 and the stripping stage 22 may be combined, in which case the second separation stage 20 would follow such a combined recovery-and-stripping stage 18, 22.

The process 10 also includes a $NaHCO_3$ concentration stage 24 (alkaline earth metal bicarbonate or carbonate recovery stage).

In the concentration stage 24, the $NaHCO_3$ solution is concentrated to crystallize $NaHCO_3$ from the solution, thus producing $NaHCO_3$ crystals and a residual liquor. In accordance with the invention, cooling or eutectic freeze crystallisation may be used for this purpose. As an alternative, evaporative crystallisation may be used, to produce $Na_2CO_3$ crystals.

The process 10 further includes a third separation stage 26.

In the third separation stage 26, $NaHCO_3$ crystals are separated from the liquor. Of course, if $Na_2CO_3$ was precipitated (crystallised) instead, then the third separation stage would be for the separation of $Na_2CO_3$ crystals from the liquor.

The liquor is a saturated aqueous solution of $NaHCO_3$ that also contains some dissolved $Na_2SO_4$.

The process 10 includes a liquor recycle line 28.

Along the recycle line 28, the liquor is recycled to the dissolution stage 12, thus minimising losses of sodium species across the process 10 in performing the method of the invention.

The process 10 also includes a drying and calcination stage 30.

In the drying and calcination stage 30, $NaHCO_3$ crystals separated from the liquor are dried and then calcined, to produce $Na_2CO_3$ as a desired product of the process 10.

The process 10 further includes a $H_2S$ conversion stage 32.

In the conversion stage 32, some of the $H_2S$ from the stripping stage 22 is converted to sulphur using conventional technology, such as the Claus process, or it is combusted and converted to sulphuric acid, both of which are further desired products of the process 10.

The process 10 further provides for production of an aqueous solution of $Ca(HS)_2$ that is used in the gypsum precipitation stage 14.

More specifically, the process 10 includes a gypsum reduction stage 34 in which gypsum from the first separation stage 16 is carbothermally reduced by reacting it with carbon, typically originating from coal, at an elevated temperature (800 to 1200° C.).

A solid product is thus produced, comprising mostly CaS mixed with ash originating from the coal. This is in accordance with reaction equation 5:

$$CaSO_4+2C=CaS+2CO_2 \quad \text{Eq. 5}$$

$CO_2$ produced in the reduction stage 34 may be recovered and cleaned by scrubbing in a scrubbing stage 35 and used in the residual calcium recovery stage 18 and in the stripping stage 22.

The process further includes a $Ca(HS)_2$ dissolution stage 36.

In the dissolution stage 36, CaS in the mixture of CaS and ash from the gypsum reduction stage 34 is dissolved in water by reacting it in water with $H_2S$ recycled from the stripping stage 22, to form $Ca(HS)_2$ which has a high solubility in water in the presence of $H_2S$ that is a weak acid. This is in accordance with reaction equation 6:

$$CaS+H_2S{=\!=}Ca(HS)_2(aq) \quad \text{Eq. 6}$$

The process 10 also includes a fourth separation stage 38.

In the fourth separation stage 38, following the dissolution of CaS to form an aqueous solution of $Ca(HS)_2$, the undissolved impurities such as ash from the coal and excess carbon, is separated from the aqueous solution. This is typically done by filtration as indicated in the fourth separation step. Naturally, other means to separate solids from liquid can also be employed.

The filtered $Ca(HS)_2$ solution is then fed to the gypsum precipitation stage 14 to react with $Na_2SO_4$ to produce the aqueous solution of NaHS and precipitated gypsum as described before.

As also mentioned before, precipitated gypsum that is separated from the aqueous solution of NaHS in the first filtration stage 16 is reduced in the gypsum reduction stage 34. This gypsum includes the $CaCO_3$ that is separated from the aqueous NaHS solution in the second separation stage 20. In the gypsum reduction stage 34, the $CaCO_3$ is converted to CaO. The CaO formed in this step also reacts with recycled $H_2S$ in the $Ca(HS)_2$ dissolution stage 36 to dissolve in the water as $Ca(HS)_2$.

Thus, it will be appreciated that the calcium sulphate used in the process is recycled and two useful products from the process are $Na_2CO_3$ and sulphur, either as elemental sulphur or sulphuric acid.

Referring now to FIG. 2, reference numeral 100 generally shows an alternative process for performing another embodiment of the method of the invention. The process 100 is a variation of the process 10. The process 100 is therefore described below with reference to the same process stages as the process 10, referenced with suffix "A".

In the process 100, an aqueous solution of $Na_2SO_4$ is reacted with CaS in aqueous suspension, rather than with $Ca(HS)_2$ in aqueous solution. The compound of calcium and sulphur used according to the method of the invention, is therefore CaS.

As in the process 10, the first step of the process is to dissolve $Na_2SO_4$ in water in a sodium sulphate dissolution stage 12A.

The aqueous solution of sodium sulphate thus obtained is then, in a gypsum precipitation stage 14A, mixed with an approximately stoichiometric quantity of CaS.

The CaS is suspended in the sodium sulphate solution, thus reacting with the $Na_2SO_4$ to form an aqueous solution of $Na_2S$ that also contains some NaHS and also some residual dissolved $CaSO_4$ (hereinafter simply referenced as "the solution of $Na_2S$"). Gypsum and a relatively small quantity of $Ca(OH)_2$ precipitate.

Following the precipitation of gypsum, the precipitated gypsum, the co-precipitated $Ca(OH)_2$ and insoluble compounds in the CaS, such as ash, are separated from the solution of $Na_2S$ in a first separation stage 16A. Standard solid liquid separation techniques can be used such as filtration, centrifuging or sedimentation. In the case of this example, filtration is used.

Whereas gypsum has a finite solubility, the solution of $Na_2S$ from the first separation stage 16A also contains some dissolved calcium cations which may be undesirable in the final product. Therefore, the process 100 also includes a residual calcium recovery stage 18A.

More specifically, in the residual calcium recovery stage 18A, calcium is removed from the solution of $Na_2S$ by the addition of a sufficient amount of carbonate, to precipitate $CaCO_3$ as in the previous example. As in the process 100, this is also achieved by adding $CO_2$ to the solution. It is also possible to add sodium carbonate ($Na_2CO_3$) or sodium bicarbonate ($NaHCO_3$), instead of $CO_2$.

The precipitated $CaCO_3$ is then separated from the solution of $Na_2S$ in a second separation stage 20A.

Although the $Na_2S$ solution obtained as a filtrate from the second separation stage 20A contains mostly $S^{2-}$ anions, it may also contain some carbonate, bicarbonate, bisulphide and sulphate anions.

In a $H_2S$ stripping stage 22A, $H_2S$ is stripped from the solution of $Na_2S$ from the second separation stage 20 using $CO_2$. Since $CO_2$ is a stronger acid than $H_2S$, all the $S^{2-}$ and $HS^-$ anions in the solution are converted to molecular $H_2S$ which is stripped from the solution.

In accordance with the invention, the recovery stage 18A and the stripping stage 22A may be combined, in which case the second separation stage 20A would follow such a combined recovery-and-stripping stage 18A, 22A.

After stripping of $H_2S$ from the solution, the solution comprises mostly dissolved $NaHCO_3$ (hereinafter referenced as "the $NaHCO_3$ solution"), but there is also some sulphate, carbonate and bicarbonate ions present in the solution.

The $NaHCO_3$ solution is then concentrated in a $NaHCO_3$ concentration stage 24A to crystallize $NaHCO_3$ from the $NaHCO_3$ solution, thus producing $NaHCO_3$ crystals and a residual liquor. As in the case of the process 10, this would be effected by cooling or eutectic freeze crystallisation, and if $Na_2CO_3$ is required, evaporative crystallisation may be used instead.

The $NaHCO_3$ (or $Na_2CO_3$ if evaporative crystallisation was employed) crystals are separated from the liquor in a third separation stage 26A.

In a drying and calcination stage 30A, $NaHCO_3$ crystals separated from the liquor are dried and then calcined, to produce $Na_2CO_3$ as a desired product of the process 100.

In a $H_2S$ conversion stage 32A, the $H_2S$ from the stripping stage 22A is converted to sulphur using conventional technology, such as the Claus process, or it is combusted and converted to sulphuric acid, both of which are further desired products of the process 100.

The separated liquor is a saturated aqueous solution of $NaHCO_3$ that also contains some dissolved $Na_2SO_4$. The liquor is recycled, along recycle line 28A, to the dissolution stage 12A, thus minimising losses of sodium species across the process 100 in performing the method of the invention.

The process 100 further provides for the production of the CaS that is used in the gypsum precipitation stage 14A.

More specifically, gypsum is carbothermally reduced in a gypsum reduction stage 34A by reacting it with carbon, typically originating from coal, at an elevated temperature (800 to 1200° C.).

A solid product is thus produced, comprising mostly CaS mixed with ash originating from the coal. $CO_2$ is also produced.

$CO_2$ produced in the reduction stage 34A may be recovered and cleaned by scrubbing in a scrubbing stage 35A, and used in the gypsum precipitation stage 14A and in the stripping stage 22A.

The precipitated gypsum and $Ca(OH)_2$ that are separated from the aqueous $Na_2S$ solution in the first filtration stage 16A may be recycled to the gypsum reduction stage 34A. However, some of this may have to be purged in order to prevent the accumulation of ash in the circuit.

Thus, it will be appreciated that, as in the case of the first example, the calcium sulphate used in the process is recycled and two useful products from the process are $Na_2CO_3$ and sulphur, either as elemental sulphur or sulphuric acid.

In accordance with the invention, the alkaline earth metal in either the process 10 or the process 100 may be barium instead of calcium. In such a case, the fundamental chemistry of the method of the invention and, therefore, the method and corresponding process steps remains virtually unchanged.

There are, however, certain advantages to barium being the alkaline earth metal over calcium. These advantages apply to and thus characterise the invention both as characterised in the examples above and as characterised in the summary of the invention.

One advantage is that barium sulphate, which would be formed when reacting the alkali metal sulphate with barium sulphide or barium hydrosulphide, has a lower solubility in water compared to gypsum.

As a result, virtually no sulphate remains in the solution of the one or more sulphides of the alkali metal, if a stoichiometric excess of barium sulphide or hydrosulphide is used. Using a slight excess of BaS would cause the barium sulphate to precipitate, and allow for its removal in the first separation stage. Thus, the recycle line 28 shown in FIG. 1 or recycle line 28A shown in FIG. 2 may be omitted.

Another such advantage is that significantly less energy is required to reduce barium sulphate than that which is required to reduce calcium sulphate, as represented by reaction equations 7 and 8 below:

$$BaSO_{4,\ 25^\circ\ C.}+2_{25^\circ\ C.}=BaS_{1000^\circ\ C.}2CO_2(g)_{1000^\circ\ C.}\Delta H=359\ \text{kJ/mol} \quad \text{Eq. 7}$$

$$CaSO_4.2H_2O_{25^\circ\ C.}+2C_{25^\circ\ C.}=CaS_{1000^\circ\ C.}+2CO_2(g)_{1000^\circ\ C.}\Delta H=503\ \text{kJ/mol} \quad \text{Eq. 8}$$

A further advantage is that the amount of gas that is released in the process is also lower in the case of barium being the alkali earth metal than in the case of calcium being the alkali earth metal.

The invention claimed is:

1. A method of producing a carbonate or a bicarbonate of an alkali metal, in solid form, from a sulphate of the alkali metal, and elemental sulphur or sulphuric acid, the method including:

in a first reaction step, reacting, in aqueous medium, a sulphate of an alkali metal with one or more alkaline earth metal sulphides, thus forming an aqueous solution of one or more sulphides of the alkali metal and one or more sulphates of the alkaline earth metal in solid form;

in a second reaction step, in the aqueous solution of one or more sulphides of the alkali metal, reacting the one or more sulphides of the alkali metal with carbon dioxide ($CO_2$) in gaseous form, thus forming an aqueous solution of a bicarbonate of the alkali metal and gaseous hydrogen sulphide;

in a recovery step, recovering a carbonate or the bicarbonate of the alkali metal, in solid form, from the aqueous solution of the bicarbonate of the alkali metal;

in an alkaline earth metal sulphide regeneration step, regenerating one or more alkaline earth metal sulphides by subjecting one or more sulphates of the alkaline earth metal, formed in the first reaction step, to carbothermal reduction and thus obtaining one or more regenerated alkaline earth metal sulphides; and in a hydrogen sulphide processing step, converting the hydrogen sulphide to elemental sulphur or to sulphuric acid.

2. The method according to claim 1, wherein the alkali metal is selected from sodium and potassium;

the alkaline earth metal is selected from calcium and barium; and the one or more alkaline earth metal sulphides is/are selected from one or a combination of a sulphide and a hydrosulphide of the alkaline earth metal.

3. The method according to claim 1, wherein the one or more alkaline earth metal sulphides include/s a hydrosulphide of the alkaline earth metal and the method includes producing the hydrosulphide of the alkaline earth metal as an aqueous solution thereof by reacting a sulphide of the alkaline earth metal in water with gaseous hydrogen sulphide produced in the second reaction step.

4. The method according to claim 1, which includes, in a first separation step ahead of the second reaction step, separating the one or more sulphates of the alkaline earth metal, produced in the first reaction step in solid form, from the aqueous solution of one or more sulphides of the alkali metal.

5. The method according to claim 1, which includes, in a residual alkaline earth metal recovery step, recovering residual alkaline earth metal of the one or more alkaline earth metal sulphides that remains dissolved in the aqueous solution of the one or more sulphides of the alkali metal, by reacting such residual alkaline earth metal with one or more of $CO_2$ in gaseous form, alkali metal carbonate, and alkali metal bicarbonate, thus producing a precipitate comprising a carbonate of the alkaline earth metal in solid form.

6. The method according to claim 1, wherein the alkaline earth metal is calcium and the alkaline earth metal sulphide that is regenerated in the regeneration step is calcium sulphide, and the method includes reacting regenerated calcium sulphide, in water, with gaseous hydrogen sulphide produced in the second reaction step, thus producing an aqueous solution of regenerated calcium hydrosulphide.

7. The method according to claim 1, wherein the alkaline earth metal is barium and alkaline earth metal sulphide that is regenerated in the regeneration step is barium sulphide, and the method includes dissolving the regenerated barium sulphide in water, thus producing an aqueous solution of regenerated barium sulphide.

8. The method according to claim 1, which includes using the regenerated alkaline earth metal sulphide or regenerated calcium sulphide or regenerated calcium hydrosulphide or regenerated barium sulphide as the alkaline earth metal sulphide in performing the first reaction step.

9. The method according to claim 1, wherein the recovery step includes subjecting the aqueous solution of the bicarbonate of the alkali metal to one of evaporative crystallisation, cooling crystallisation, and eutectic freeze crystallisation to recover the carbonate or bicarbonate of the alkali metal in solid form from the aqueous solution of the bicarbonate of the alkali metal.

10. The method according to claim 9, wherein evaporative crystallisation is performed and the bicarbonate of the alkali metal in the aqueous solution of the bicarbonate of the alkali metal is sodium bicarbonate, and sodium carbonate is recovered in solid form; or the bicarbonate of the alkali metal in the aqueous solution of the bicarbonate of the alkali metal is potassium bicarbonate, and potassium bicarbonate is recovered in solid form.

11. The method according to claim 9, wherein the bicarbonate of the alkali metal is recovered in solid form and the method includes subjecting the bicarbonate of the alkali metal in solid form to heat treatment, thus producing a carbonate of the alkali metal in solid form.

* * * * *